US008363195B2

(12) United States Patent
Yokoyama

(10) Patent No.: US 8,363,195 B2
(45) Date of Patent: Jan. 29, 2013

(54) DISPLAY APPARATUS

(75) Inventor: Yohsuke Yokoyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/502,403

(22) PCT Filed: Jun. 9, 2010

(86) PCT No.: PCT/JP2010/059793

§ 371 (c)(1),
(2), (4) Date: Apr. 17, 2012

(87) PCT Pub. No.: WO2011/048844

PCT Pub. Date: Apr. 28, 2011

(65) Prior Publication Data

US 2012/0212463 A1 Aug. 23, 2012

(30) Foreign Application Priority Data

Oct. 22, 2009 (JP) ................................. 2009-243292

(51) Int. Cl.
*G02F 1/1343* (2006.01)

(52) U.S. Cl. .......... 349/143; 349/84; 349/139; 349/145; 349/149; 349/151

(58) Field of Classification Search .................... 349/56, 349/84, 139, 143, 145, 149, 151
See application file for complete search history.

(56) References Cited

U.S. PATENT DOCUMENTS

| | | | | |
|---|---|---|---|---|
| 6,377,235 | B1 * | 4/2002 | Murade et al. | 345/100 |
| 6,677,925 | B1 | 1/2004 | Kawaguchi et al. | |
| 2002/0044127 | A1 | 4/2002 | Uchino et al. | |
| 2010/0026921 | A1 * | 2/2010 | Tsubata | 349/37 |

FOREIGN PATENT DOCUMENTS

| | | | |
|---|---|---|---|
| JP | 7-318898 | A | 12/1995 |
| JP | 2000-2885 | A | 1/2000 |
| JP | 2001-147420 | A | 5/2001 |
| JP | 2002-023683 | A | 1/2002 |
| JP | 2002-55656 | A | 2/2002 |
| JP | 2004-118089 | A | 4/2004 |
| JP | 2008-58345 | A | 3/2008 |

OTHER PUBLICATIONS

Official Communication issued in International Patent Application No. PCT/JP2010/059793, mailed on Jul. 6, 2010.

* cited by examiner

*Primary Examiner* — Jennifer Doan
(74) *Attorney, Agent, or Firm* — Keating & Bennett, LLP

(57) ABSTRACT

A liquid crystal display panel (10) includes: an active-matrix substrate (not illustrated), a counter substrate (not illustrated), liquid crystals sandwiched between the active-matrix substrate and the counter substrate; and a plurality of pixels (P) arranged in rows and columns. Each of the rows is provided with a plurality of gate signal lines (12) for supplying scanning signals having different pulse widths from each other, and the pixels of the same row are divided into a plurality of groups according to which of the gate signal lines (12) the pixels are connected to. The pulse widths of the scanning signals that are supplied to the respective groups are set according to the position of each of the groups with respect to an auxiliary capacitor signal line driving circuit (40) such that one of the groups which is further from a point close to one edge near the auxiliary capacitor signal line driving circuit (40) with respect to the auxiliary capacitor signal line driving circuit (40) is supplied with that one of the scanning signals which has a smaller pulse width.

5 Claims, 13 Drawing Sheets

DISPLAY APPARATUS

TECHNICAL FIELD

The present invention relates to display devices and, in particular, to an active-matrix display device.

BACKGROUND ART

In recent years, there has been a rapidly growing demand for liquid crystal display devices, etc. in the form of flat panel displays. Since liquid crystal display devices consume less electric power and can be more easily made in a small size than CRTs (cathode-ray tubes), liquid crystal display devices have been widely used in cellular phones, portable game machines, in-vehicle navigation systems, etc., as well as televisions. Among these liquid crystal display devices, active-matrix liquid crystal display devices have been widely used because they are high in response speed and make it easy to display multiple tones.

However, an attempt to achieve an active-matrix liquid crystal display device or, in particular, an active-matrix liquid crystal display device having a wider display screen with higher resolution makes shadows likely to appear, thus undesirably degrading image quality.

(a) and (b) FIG. 10 are diagrams for explaining shadows appearing on the display screen of a liquid crystal display device.

For example, in such a case as that shown in (a) of FIG. 10 where the liquid crystal display device displays a screen image having a background of a certain gray scale and a window of another gray scale in the background, shadows that are different from the original gray scales may appear on the upper, lower, right, and left sides of the window. The shadows appearing on the right and left sides of the window, i.e., the shadows appearing in areas A, are called "horizontal shadows", and the shadows appearing on the upper and lower sides of the window, i.e., the shadows appearing in areas B, are called "vertical shadows".

Because a vertical shadow and a horizontal shadow are attributable to different causes, it is necessary to take separate measures against them.

First, the cause of a vertical shadow is explained with reference to FIG. 11.

FIG. 11 is an equivalent circuit diagram of an active-matrix liquid crystal display device. The liquid crystal display device shown in FIG. 11 includes: a plurality of scanning signal lines X1, X2, and so forth; a plurality of data signal lines Y1, Y2, and so forth orthogonal to the scanning signal lines; and a plurality of display elements P (regions surrounded by dotted lines) provided at points of intersections between the scanning signal lines and the data signal lines, respectively. Each of the display elements P corresponds to a single pixel (or a single subpixel). FIG. 11 shows a point Q that corresponds to a pixel electrode connected to the drain electrode of a switching transistor TR and to one electrode of a liquid crystal cell (liquid crystal capacitor) Cx.

The pixel electrode in each display element P forms parasitic capacitors (source-drain capacitors) Csd1 and Csd2 with two data signal lines, respectively, between which that display element P is interposed. For this reason, even when the switching transistor TR is off, a change in voltage of the data signal lines leads to a change in drain voltage (voltage at the point Q) of the switching transistor TR, so that there is also a change in liquid crystal application voltage, which is a difference between the drain voltage and a common electrode voltage Vcom. Further, the liquid crystal molecules contained in each pixel element P respond to the root-mean-square of a voltage that is applied to the liquid crystals during a single vertical period. For this reason, even when two display elements arranged in the same row are supplied with the same voltage by turning on the switching transistors TR, the two pixels differs in luminance from each other if the two data signal lines between which one of the display elements is interposed and the two data signal lines between which the other display element is interposed differ in voltage from each other while the switching transistors TR are off. For the reasons stated above, a vertical shadow appears on the display screen.

Let it be assumed here that the liquid crystal display device shown in FIG. 11 is a normally white liquid crystal display device in which dot-reversal driving is carried out, that P(i,j) denotes a display element P provided at a point of intersection between a scanning signal line Xi and a data signal Yj, and that PX(i,j) denotes a pixel corresponding to the display element. Further, for simplification of explanation, only the influence of the parasitic capacitor between the pixel electrode in the display element P(i,j) and the data signal line Yj is taken into account, and the influence of the parasitic capacitor between the pixel electrode and a data signal line Yj+1 is disregarded.

FIG. 12 is a signal waveform chart showing a voltage in the display element P(i,j) in a case where the pixel PX(i,j) is in an area C (where there is no vertical shadow) of (b) of FIG. 10.

As shown in FIG. 12, the voltage of the scanning signal line Xi is at a high level only during a single horizontal period in a single vertical period. While the voltage of the scanning signal line Xi is at a high level, the switching transistor TR is turned on, so that the drain voltage of the switching transistor TR becomes equal to the voltage of the data signal line Yi. After that, when the voltage of the scanning signal line Xi is changed to a low level, the switching transistor TR is turned off. Even while the switching transistor TR is off, a change in voltage of the data signal line Yi leads to a change in drain voltage of the switching transistor TR, so that there is also a change in liquid crystal application voltage.

In a conventional liquid crystal display device, a voltage corresponding to black data, for example, is supplied to the data signal line Yj during a vertical flyback period. For this reason, in the normally white liquid crystal display device, there is a great change in voltage of the data signal line Yj during a vertical flyback period, with the result that there are great changes both in drain voltage of the switching transistor TR and in liquid crystal application voltage.

The effective value Vrms of the voltage applied to the liquid crystals in the display element P(i,j) is equal to the root-mean-square of the voltage applied to the liquid crystals during a single vertical period, as represented by expression (1) as follows:

$$Vrms=\{(\int\{f(t)\}^2dt)/T\}^{1/2} \quad (1),$$

where f(t) is the liquid crystal application voltage and T is the period of time from the completion of writing of data to a display element P to the start of next writing of data to the same display element P (as obtained by subtracting a single horizontal period from a single vertical period).

FIG. 13 is a signal waveform chart showing a voltage in the display element P(i,j) in a case where the pixel PX(i,j) is in an area B (where there is a vertical shadow) of (b) of FIG. 10. In FIG. 13, albeit similar to FIG. 12, there is a great change in voltage of the data signal line Yj during a window display period as well as a vertical flyback period, with the result that there are great changes both in drain voltage of the switching transistor TR and in liquid crystal application voltage.

A contrast between FIG. 12 and FIG. 13 shows that a display element corresponding to a pixel in an area C and a display element corresponding to a pixel in an area B differ in effective value of liquid crystal application voltage. For this reason, the pixel in the area C and the pixel in the area B differ in luminance from each other, with the result that a vertical shadow appears.

Patent Literature 1 describes an active-matrix liquid crystal display device that prevents a vertical shadow.

The active-matrix liquid crystal display device is described below with reference to FIG. 14.

FIG. 14 is a block diagram showing a configuration of the liquid crystal display device.

As shown in FIG. 14, a display control circuit 211 includes a timing control section 212, a column data calculation section 213, a look-up table (hereinafter referred to as "LUT") 214, a switch 215, and an LUT control section 216. The display control circuit 211 functions as a data processing circuit to obtain vertical flyback period data B in accordance with image data D inputted thereto and change between outputting the image data D and outputting the vertical flyback period data B.

Specifically, the column data calculation section 213 carries out a predetermined calculation of column-wise data contained in image data D inputted thereto, and outputs a calculation result A. The LUT 214 converts the calculation result A into vertical flyback period data B. The switch 215 switches, in accordance with a timing control signal TC, between outputting the image data D during an effective period of the image data D and outputting the vertical flyback period data B during a vertical flyback period. A data signal line driving circuit 203 drives data signal lines Y1 to Ym in accordance with the data outputted from the display control circuit 211. When the image data D is moving image data, the display control circuit 211 may stop the process of obtaining vertical flyback period data B, and may obtain vertical flyback period data B in accordance with the ambient temperature and the intensity of outside light.

The foregoing configuration makes it possible, even when a change in data signal line voltage results in a change in liquid crystal application voltage retained in a display element, to use suitable vertical flyback period data B to control to a desired level the effective value of the liquid crystal application voltage retained in the display element, thus making it possible to control the luminance of the display element and thereby prevent a vertical shadow from appearing on the display screen.

CITATION LIST

Patent Literature 1

Japanese Patent Application Publication, Tokukai, 2008-58345 A (Publication Date: Mar. 13, 2008)

Patent Literature 2

Japanese Patent Application Publication, Tokukai, 2000-2885 A (Publication Date: Jan. 7, 2000)

Patent Literature 3

Japanese Patent Application Publication, Tokukai, 2004-118089 A (Publication Date: Apr. 15, 2004)

SUMMARY OF INVENTION

Technical Problem

However, a high-resolution active-matrix display device or, in particular, a high-resolution active-matrix display device having a landscape display screen makes horizontal shadows likely to appear, thus undesirably degrading image quality.

This is considered to be because the auxiliary capacitor signal lines arranged in the display device become higher in resistance as they become longer and thinner and thus affect a display.

FIG. 4 is a set of waveform charts showing gate signals (scanning signals) Vg and CS potentials in two pixels of a conventional display device.

(a) of FIG. 4 is a waveform chart showing a gate signal Vg and a CS potential in a far pixel located away from the auxiliary capacitor signal line driving circuit, and (b) FIG. 4 is a waveform chart showing a gate signal Vg and a CS potential in a near pixel located close to the auxiliary capacitor signal line driving circuit.

As shown in FIG. 4, a CS potential is pulled out at a rising or falling edge of a gate signal Vg. It should be noted that the CS potential of the far pixel takes a blunter waveform than the CS potential of the near pixel. That is, the CS potential of the near pixel is pulled out less and recovers sooner, and settles down at a higher level than the CS potential of the far pixel as soon as the data signal Vg rose up at a rising edge.

This means that CS potentials vary depending on a positional relationship between each pixel and the auxiliary capacitor signal line driving circuit, so that there is a variation among the voltages that are actually applied to the display elements.

This results in the appearance of horizontal shadows on the display screen of the display device.

FIG. 5 is a set of diagrams each showing an example of a display screen image shown by a conventional display device.

The display screen image shown in (a) of FIG. 5 is a specific display pattern ("killer" pattern) composed of a solid-display background and a black-display (e.g., L0) window portion.

This specific display pattern is composed of areas A in all of which a solid display is carried out during a single horizontal scanning period and an area B containing a window in which a black display is carried out.

Further, the area B contains (i) the window in which a black display is carried out, (ii) an area B1, located on the left side of the window, in which a solid display is carried out, and (iii) an area B2, located on the right side of the window, in which a solid display is carried out.

(b) through (d) of FIG. 5 are diagrams showing several types of horizontal shadow that appear in the specific display pattern shown in (a) of FIG. 5.

As shown in (b) of FIG. 5, the solid display in the area B2 is darker than those in the other areas.

As shown in (c) of FIG. 5, the solid display in the area B1 is brighter than those in the other areas.

As shown in (d) of FIG. 5, the solid display in the area 2 is brighter that those in the areas A, and is darker than that in the area B1. That is, the solid display in the area B1 is brighter than those in the other areas.

Patent Literature 1 does not disclose a configuration for preventing a horizontal shadow.

The present invention has been made in view of the foregoing problems, and it is an object of the present invention to provide a display device which, without correcting pixel data inputted thereto, not only prevents a horizontal shadow but also improves display quality.

Solution to Problem

A display device according to the present invention is a display device of an active-matrix type having a plurality of pixels arranged in rows and columns, including: scanning signal lines; a scanning signal line driving circuit that drives the scanning signal lines; auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through one and the same edge of or opposite and different edges of the display region, each of the rows being provided with a plurality of the scanning signal lines for supplying those ones of the scanning signals which have different pulse widths from each other, the pixels of the same row being divided into a plurality of groups according to which of the scanning signal lines the pixels are connected to, the plurality of groups being arranged along the scanning signal lines, the pulse widths of the scanning signals that are supplied to the respective groups being set according to a position of each of the groups with respect to the auxiliary capacitor signal line driving circuit such that one of the groups which is further from a point close to one edge near the auxiliary capacitor signal line driving circuit with respect to the auxiliary capacitor signal line driving circuit is supplied with that one of the scanning signals which has a smaller pulse width.

According to the foregoing configuration, a pixel located away from the auxiliary capacitor signal line driving circuit is supplied with a gate signal having a small pulse width. This causes an auxiliary capacitor potential to be subjected to a boost due to a rise in the gate signal after the auxiliary capacitor potential rose to a considerable degree; therefore, the voltage that is actually applied to the display element is adjusted to substantially the same potential as in a case where the auxiliary capacitor potential has no bluntness in its waveform. This makes it possible not only to prevent a horizontal shadow, but also to control to a desired level the effective value of a voltage that is applied to each display element. This brings about an effect of making it possible to improve display quality by controlling the luminance of each display element to a desired level.

A display device according to the present invention is a display device of an active-matrix type having a plurality of pixels arranged in rows and columns, including: scanning signal lines; a scanning signal line driving circuit that drives the scanning signal lines; auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through both one edge of the display region and another edge opposite to that one edge, each of the rows being provided with a plurality of the scanning signal lines for supplying those ones of the scanning signals which have different pulse widths from each other, the pixels of the same row being divided into a plurality of groups according to which of the scanning signal lines the pixels are connected to, the plurality of groups being arranged along the scanning signal lines, the pulse widths of the scanning signals that are supplied to the respective groups are such that one of the groups which is further from a center of the display region is supplied with that one of the scanning signals which has a larger pulse width.

According to the foregoing configuration, a pulse located substantially in the center of the display region is supplied with a scanning signal having a small pulse width. This causes an auxiliary capacitor potential to be subjected to a boost due to a rise in the gate signal after the auxiliary capacitor potential rose to a considerable degree; therefore, the voltage that is actually applied to the display element is adjusted to substantially the same potential as in a case where the auxiliary capacitor potential has no bluntness in its waveform. This makes it possible not only to prevent a horizontal shadow, but also to control to a desired level the effective value of a voltage that is applied to each display element. This brings about an effect of making it possible to improve display quality by controlling the luminance of each display element to a desired level.

A display device according to the present invention is a display device of an active-matrix type having a plurality of pixels arranged in rows and columns, including: scanning signal lines; a scanning signal line driving circuit that drives the scanning signal lines; auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through one and the same edge of or opposite and different edges of the display region, each of the rows being provided with a plurality of the auxiliary capacitor signal lines for supplying those ones of the auxiliary capacitor signals which have different potentials from each other, the pixels of the same row being divided into a plurality of groups according to which of the auxiliary capacitor signal lines the pixels are connected to, the plurality of groups being arranged along the scanning signal lines, the potentials of the auxiliary capacitor signals that are supplied to the respective groups being set according to a position of each of the groups with respect to the auxiliary capacitor signal line driving circuit such that one of the groups which is further from a point close to one edge near the auxiliary capacitor signal line driving circuit with respect to the auxiliary capacitor signal line driving circuit is supplied with that one of the auxiliary capacitor signals which has a larger potential.

According to the foregoing configuration, a pixel located away from the auxiliary capacitor signal line driving circuit is supplied with an auxiliary capacitor signal having a small potential; therefore, the voltage that is actually applied to the display element is adjusted to substantially the same potential as in a case where the auxiliary capacitor potential has no bluntness in its waveform. This makes it possible not only to prevent a horizontal shadow, but also to control to a desired level the effective value of a voltage that is applied to each display element. This brings about an effect of making it possible to improve display quality by controlling the luminance of each display element to a desired level.

A display device according to the present invention is a display device of an active-matrix type having a plurality of pixels arranged in rows and columns, including: scanning signal lines; a scanning signal line driving circuit that drives the scanning signal lines; auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through both one edge of the display region and another edge opposite to that one edge, each of the rows being provided with a plurality of the auxiliary capacitor signal lines for supplying those ones of the auxiliary capacitor signals which have different potentials from each other, the pixels of the same row being divided into a plurality of groups according to which of the auxiliary capacitor signal lines the pixels are connected to, the plurality of groups being arranged along the scanning signal lines, the potentials of the auxiliary capacitor signals that are supplied to the respective groups are such that one of the groups which is further from a center of the display region is supplied with that one of the auxiliary capacitor signals which has a smaller potential.

The foregoing configuration makes it possible not only to prevent a horizontal shadow, but also to control to a desired level the effective value of a voltage that is applied to each display element, thus bringing about an effect of making it possible to improve display quality by controlling the luminance of each display element to a desired level.

Advantageous Effects of Invention

As described above, a display device according to the present invention is a display device of an active-matrix type having a plurality of pixels arranged in rows and columns, including: scanning signal lines; a scanning signal line driving circuit that drives the scanning signal lines; auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through one and the same edge of or opposite and different edges of the display region, each of the rows being provided with a plurality of the scanning signal lines for supplying those ones of the scanning signals which have different pulse widths from each other, the pixels of the same row being divided into a plurality of groups according to which of the scanning signal lines the pixels are connected to, the plurality of groups being arranged along the scanning signal lines, the pulse widths of the scanning signals that are supplied to the respective groups being set according to a position of each of the groups with respect to the auxiliary capacitor signal line driving circuit such that that one of the groups which is further from a point close to one edge near the auxiliary capacitor signal line driving circuit with respect to the auxiliary capacitor signal line driving circuit is supplied with that one of the scanning signals which has a smaller pulse width.

The foregoing configuration makes it possible not only to prevent a horizontal shadow in the display device, but also to control to a desired level the effective value of a voltage that is applied to each display element, thus bringing about an effect of making it possible to improve display quality by controlling the luminance of each display element to a desired level.

DESCRIPTION OF EMBODIMENTS

An embodiment of the present invention is described in detail below with reference to the drawings.

Embodiment 1

Figure 1:
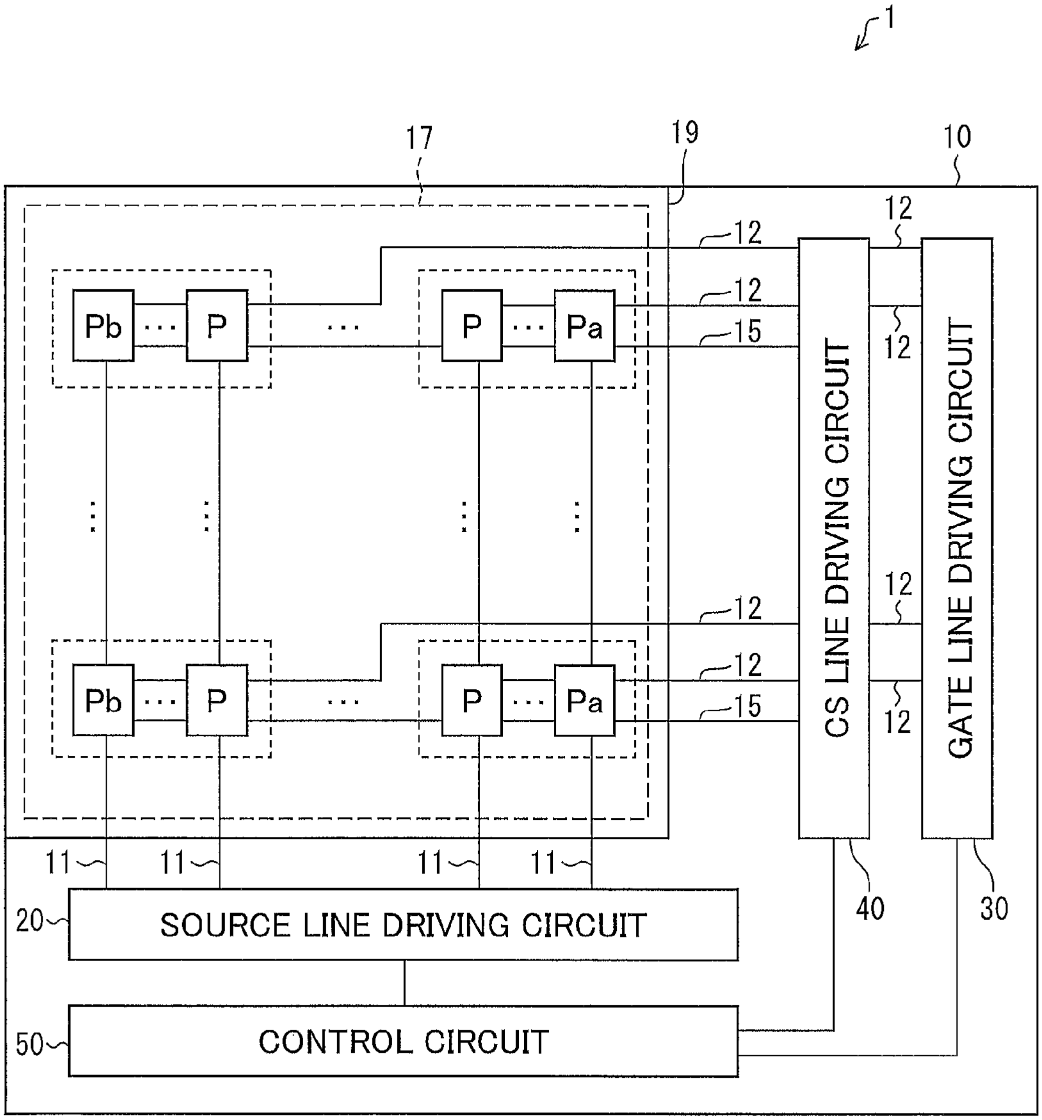
FIG. 1, showing an embodiment of the present invention, is a block diagram showing a configuration of a liquid crystal display device according to Embodiment 1.

First, a configuration of a liquid crystal display device (display device) in accordance with the present embodiment is described with reference to FIGS. 1 through 3. FIG. 1 is a block diagram showing an overall structure of a liquid crystal display device.

As shown in FIG. 1, a liquid crystal display device 1 includes an active-matrix liquid crystal display panel 10, a source line driving circuit (data signal line driving circuit) 20, a gate line driving circuit (scanning signal line driving circuit) 30, a CS line driving circuit (auxiliary capacitor signal line driving circuit) 40, and a control circuit 50.

The liquid crystal panel 10 includes: an active-matrix substrate (not illustrated), a counter substrate (not illustrated), liquid crystals sandwiched between the active-matrix substrate and the counter substrate; and a plurality of pixels P (including Pa and Pb) arranged in rows and column.

Moreover, the liquid crystal display panel 10 includes source lines 11, gate lines (scanning signal lines) 12, thin-film transistors (hereinafter referred to as "TFTs") 13 (see FIG. 3), pixel electrodes 14 (see FIG. 3), and CS lines (auxiliary capacitor signal lines) 15 on the active-matrix substrate, and includes a counter electrode 19 on the counter substrate.

The source lines 11 extend parallel to each other in a column-wise direction (longitudinal direction), with each column provided with one of these source lines 11.

The gate lines 12 extend in a row-wise direction (transverse direction), with each row provided with several of these gate lines 12.

By turning on the gates of the TFTs 13 with gate signals (scanning signals) that are supplied to the gate lines 12 and writing source signals (data signals) from the source lines 11 to the pixel electrodes 14, the pixel electrodes 14 are set to potentials corresponding to the source signals. By applying voltages corresponding to the source signals to liquid crystals sandwiched between the pixel electrodes 14 and the counter electrode 19, a gray scale display corresponding to the source signals can be achieved.

It should be noted that the pixels P of the same row are divided into a plurality of groups according to which of the gate lines 12 the pixels P are connected to, the plurality of groups being arranged along the gate lines 12, and that the pulse widths of the gate signals that are supplied to the respective groups are set according to the position of each of the groups with respect to the CS line driving circuit 40 such that one of the groups which is further from a point close to one edge near the auxiliary capacitor signal line driving 40 circuit with respect to the auxiliary capacitor signal line driving circuit 40 is supplied with that one of the gate signals which have a smaller pulse width.

The CA lines 15 extend parallel to each other in the row-wise direction (transverse direction), with each row provided with one of these CS lines 15. Each of these CS lines 15 is capacitively coupled to the pixel electrodes 14 disposed in the corresponding row, and forms a retention capacitor (also referred to as "auxiliary capacitor") with each of the corresponding pixel electrodes 14.

In the liquid crystal display device 1 shown in FIG. 1, each of the gate lines 12 is connected to the gate line driving circuit 30, and there are more gate lines 12 than in a case where each row is provided with just a single gate line 12. Therefore, it is possible to use a gate SSD (source shared driving) drive system for the purpose of curbing the number of outputs from the gate line driving circuit 30. The gate SSD drive is a drive system for driving the scanning signal lines 12 in a time-sharing manner for each set composed of a plurality of scanning signal lines 12.

Figure 2:
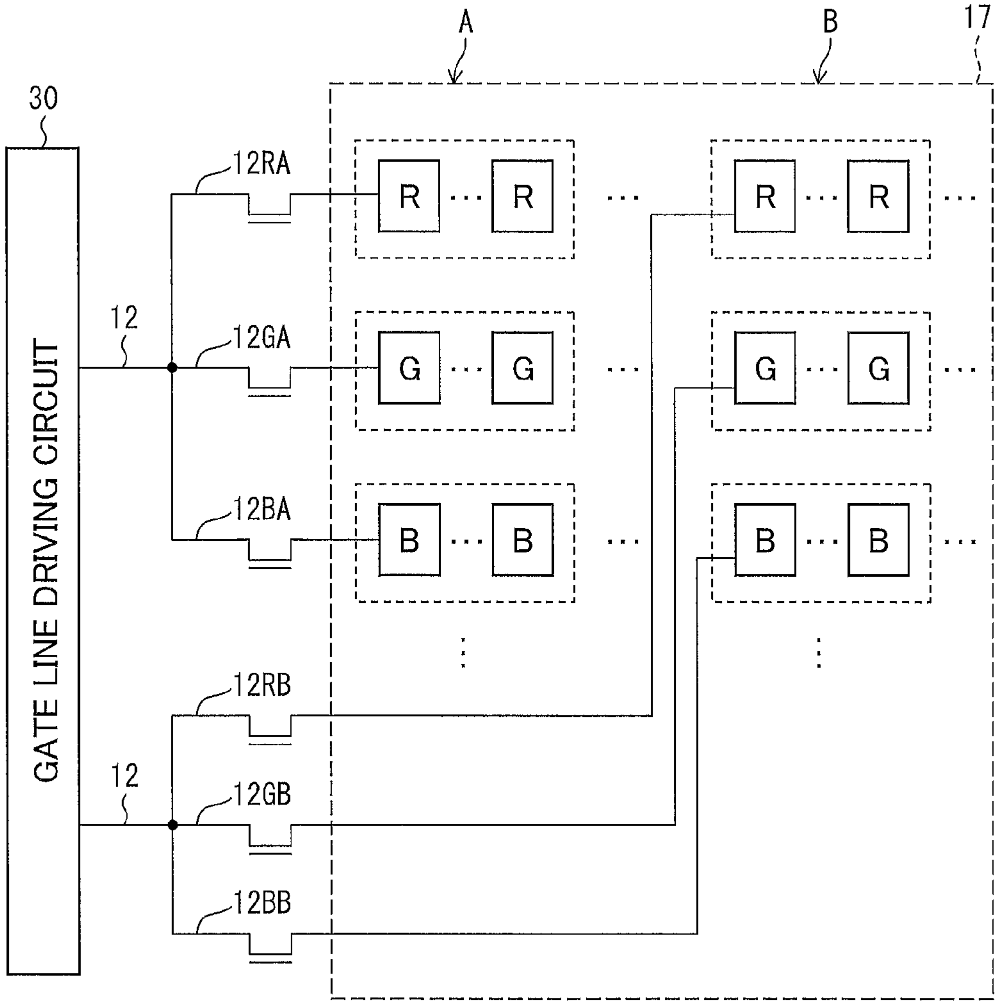
FIG. 2 is a plan view schematically showing an arrangement of gate lines in the liquid crystal display device according Embodiment 1 of the present invention.

FIG. 2 is a diagram schematically showing an arrangement of gate lines in a case where the gate SSD drive system is used.

As shown in FIG. 2, the pixels in each row are divided into groups A and B according to the distance from the CS line driving circuit 40, with gate lines formed for each of the groups.

Three gate lines 12RA, 12GA, and 12BA are bundled together via their respective gate switching elements, and are connected as a set to the gate line driving circuit 30. By controlling on/off of the gate switching elements, the three gate lines 12RA, 12GA, and 12BA, which form a set, are selected in sequence.

For example, the gate line 12RA is written to by one pulse of gate signal, and the gate lines 12RA, 12GA, and 12BA are written to by three pulses of gate signal.

The same applies to gate lines 12RB, 12GB, and 12BB.

The pulse widths of gate signals that are supplied to the groups A and B are different. Since the group B is located away from the CS line driving circuit 40 provided on the side of the gate line driving circuit 30, the pulse widths of gate signals that are supplied to the group B are smaller than the pulse widths of gate signals that are supplied to the group A. This is described in detail below with reference to FIG. 7.

Figure 3:
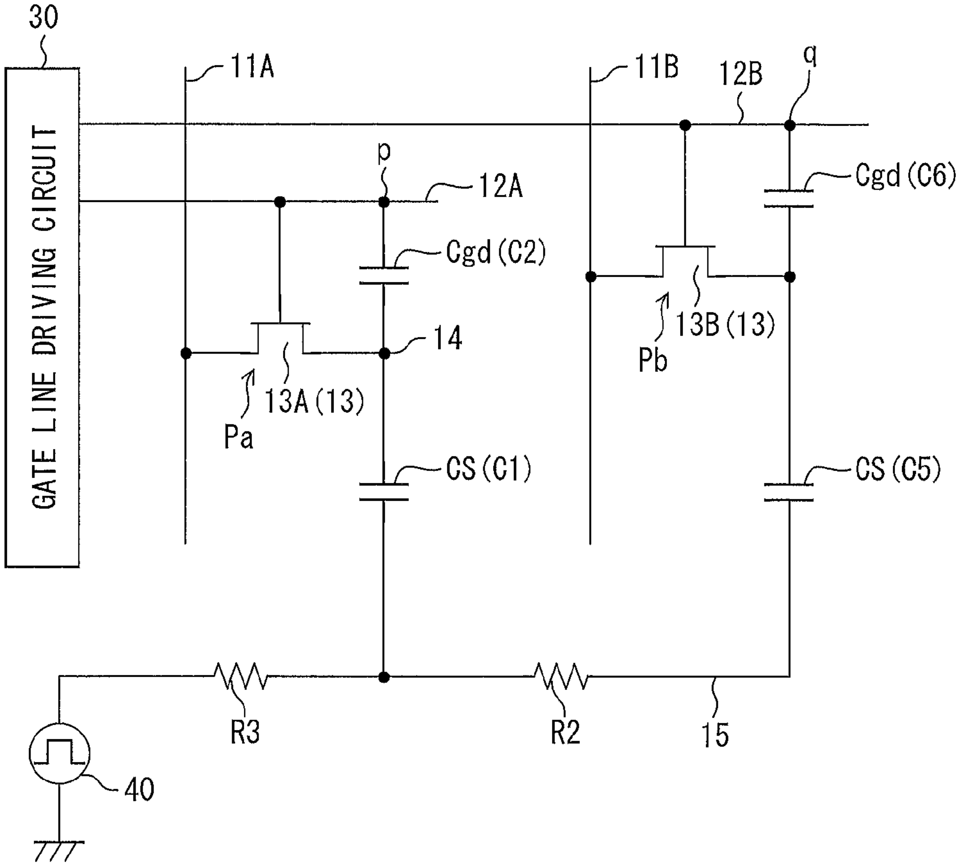
FIG. 3 is an equivalent circuit diagram showing an electric configuration of pixels of the liquid crystal display device according Embodiment 1 of the present invention.
Figure 4:
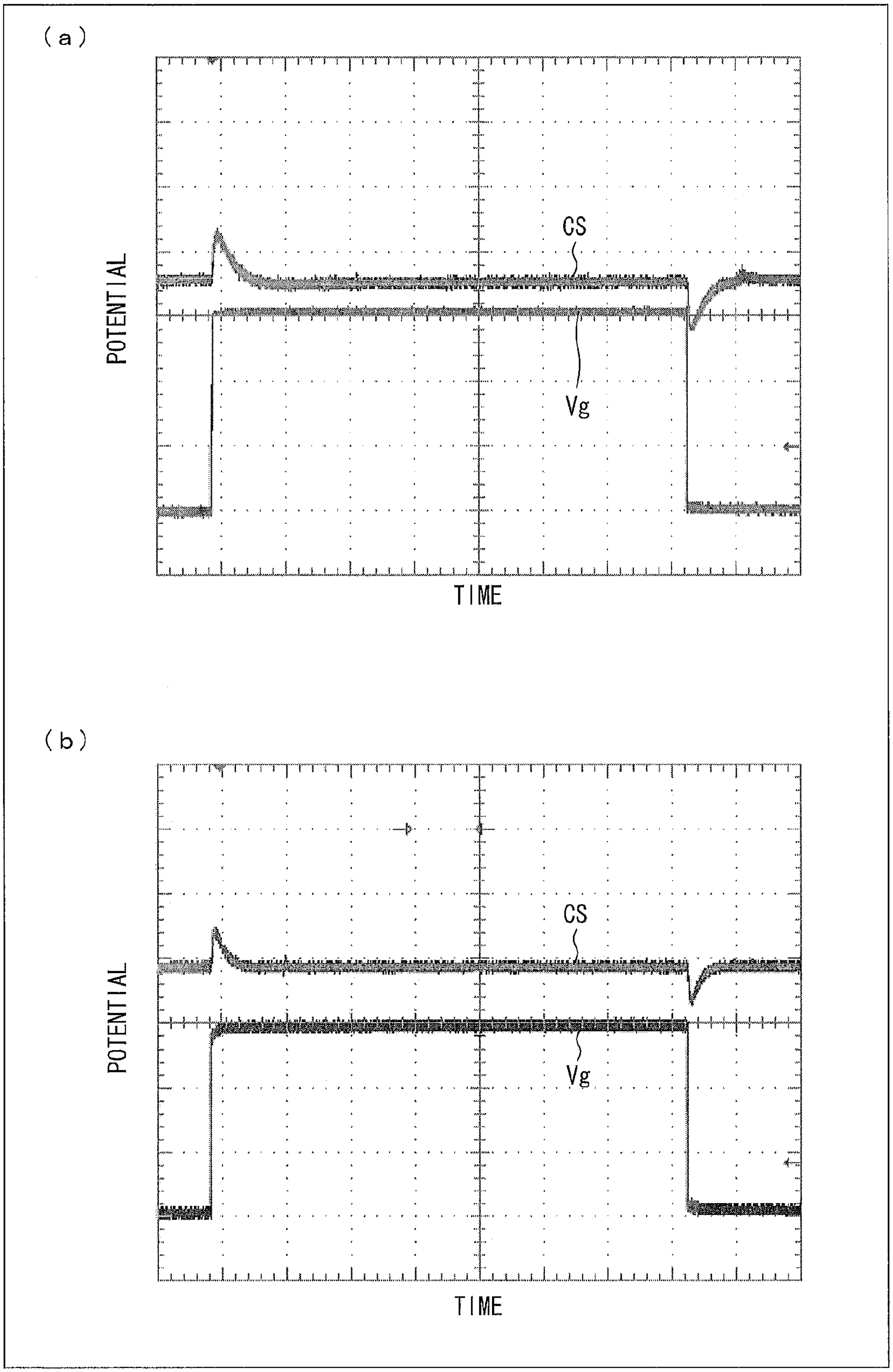
FIG. 4 is a set of waveform charts (a) and (b), (a) showing a gate signal and a CS signal that are inputted to a pixel model Pb shown in FIG. 3, (b) showing a gate signal and a CS signal that are inputted to a pixel model Pa shown in FIG. 3.

FIG. 3 is an equivalent circuit diagram showing an electric configuration of pixels of the liquid crystal display device according the present embodiment.

As shown in FIG. 1, the CS line driving circuit 40 and the gate line driving circuit 30 are disposed on the same side as each other with respect to a display region 17. As shown in FIG. 3, a gate line 12A, a gate line 12B, a source line 11A near the CS line driving circuit 40, and a source line 11B far from the CS line driving circuit 40 intersect.

Connected to the source line 11A is a pixel Pa composed of a TFT 13A, a CS capacitor C1, and a Cgd capacitor C2. It should be noted that the pixel Pa is a pixel in a column located closest to the CS line driving circuit 40 in the liquid crystal display device shown in FIG. 1, and is supplied with a gate signal via the dedicated gate line 12A.

Connected to the source line 11B is a pixel Pb composed of a TFT 13B, a CS capacitor C5, and a Cgd capacitor C6. It should be noted that the pixel Pb is a pixel in a column located furthest from the CS line driving circuit 40 in the liquid crystal display device shown in FIG. 1, and is supplied with a gate signal via the dedicated gate line 12B.

Further, the CS capacitor C1 of the pixel Pa is connected to the CS line driving circuit 40 via a CS trunk line resistor R3, and the CS capacitor C5 of the pixel Pb is connected to the CS line driving circuit 40 via the CS trunk line resistor R3 and a CS line resistor R2. The CS trunk line resistor R3 here is an auxiliary capacitor (CS) signal line outside the display region on the substrate, and is relatively small in value of resistance. Meanwhile, the CS line resistor R2 is an auxiliary capacitor (CS) signal line inside the display region on the substrate, and is relatively large in value of resistance.

In the following, the principle of operation of the liquid crystal display device in accordance with the present embodiment is explained.

Figure 6:
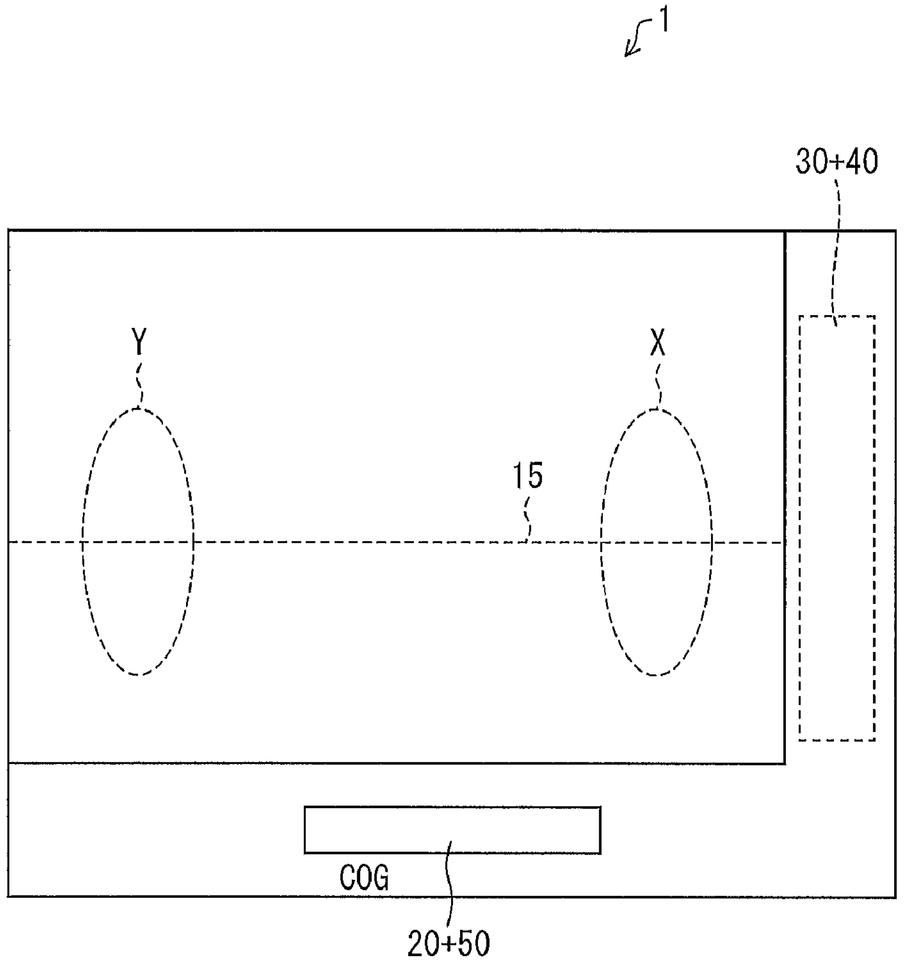
FIG. 6 is a block diagram schematically showing the configuration of the liquid crystal display device according to Embodiment 1 of the present invention.

FIG. 6 is a plan view schematically showing the configuration of the liquid crystal display device in accordance with the present embodiment.

As shown in FIG. 6, an X group composed of a plurality of pixels P is located close to the CS line driving circuit 40, and a Y group composed of a plurality of pixels P is located away from the CS line driving circuit 40.

Figure 7:
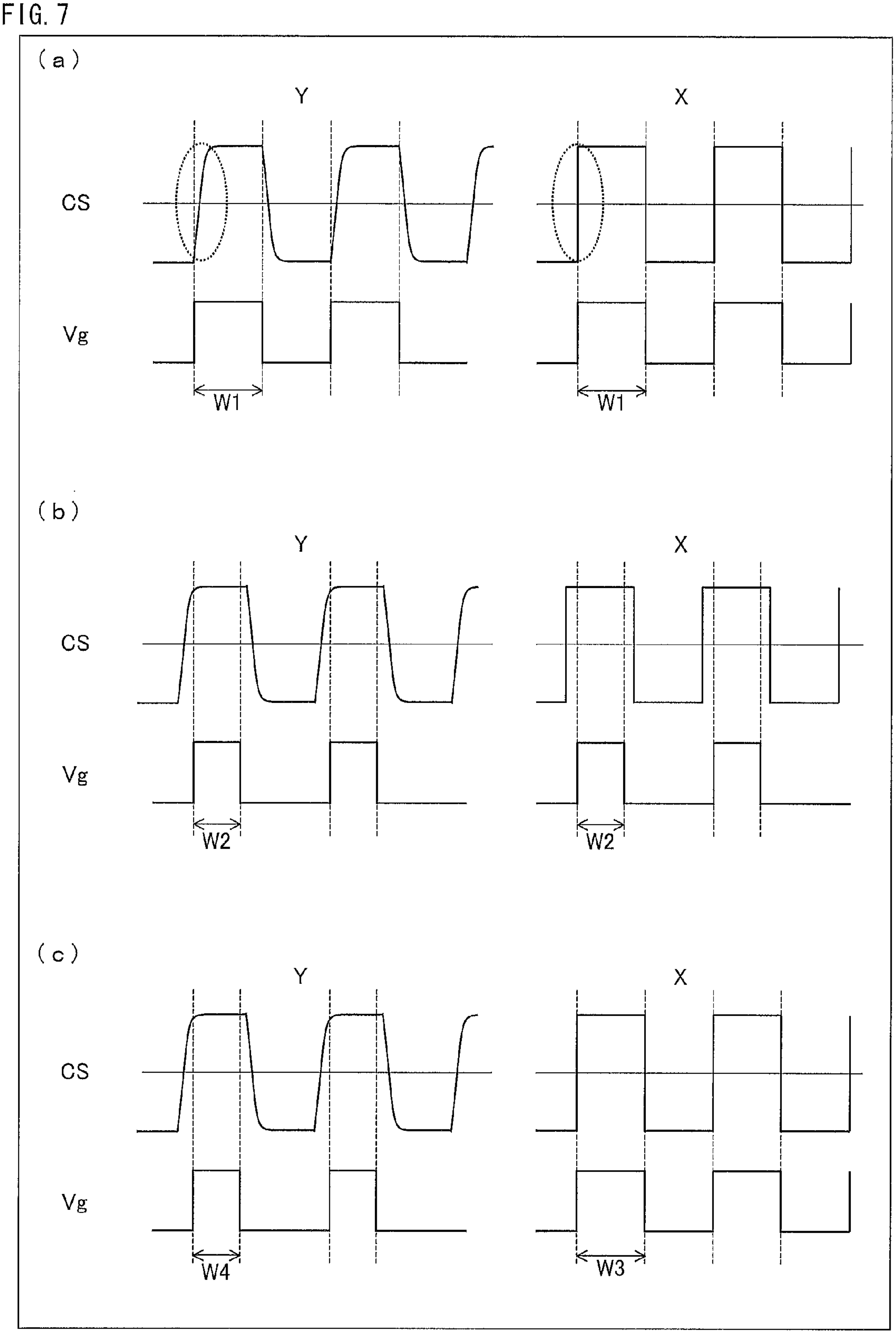
FIG. 7 is a set of waveform charts (a) through (c) each showing gate signals and CS signals that are inputted to pixel models shown in FIG. 6.

FIG. 7 is a set of waveform charts each showing the CS potentials of the X and Y groups and gate signals Vg.

As surrounded by dotted lines in (a) of FIG. 7, a rising/falling edge of the CS potential of the X group that is close to the CS line driving circuit 40 is small in bluntness, and a rising/falling edge of the CS potential of the Y group that is far from the CS line driving circuit 40 is large in bluntness.

Figure 5:
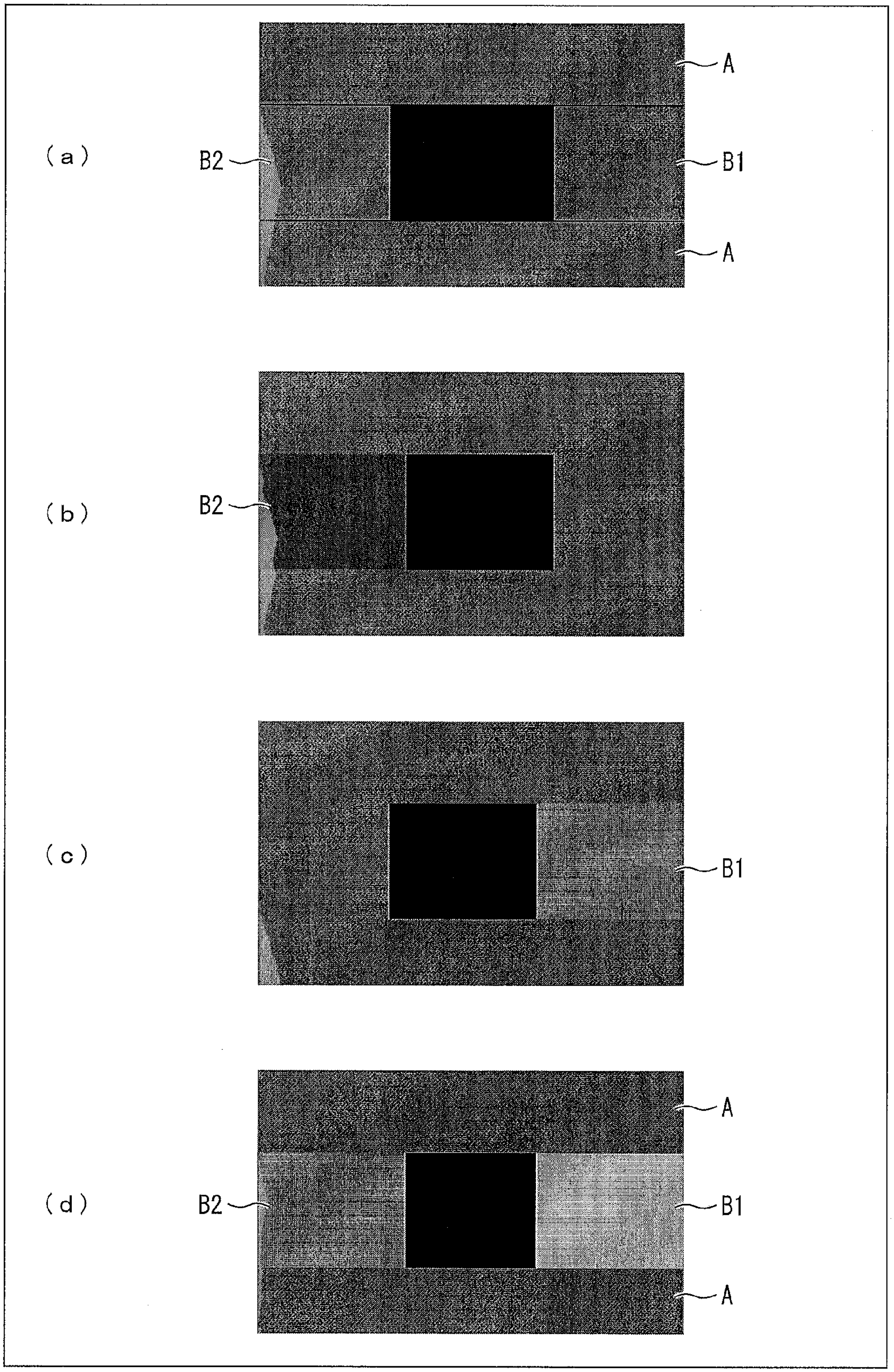
FIG. 5 is a set of diagrams (a) through (d) each showing an example of a display screen image shown by a conventional liquid crystal display device described in Embodiment 1 of the present invention.

If gate signals Vg of the same pulse width W1 are inputted to the groups X and Y, such horizontal shadows as those shown in (b) of FIG. 5 appear during a display of the specific display pattern shown in (a) of FIG. 5.

The reason for this as follows: Since the Y group located away from the CS line driving circuit 40 is large in bluntness at the time of a rising reversal of the gate signal Gg and the CS potential is pulled out due to writing of black data, the CS potential becomes late in rising; therefore, while the group Y gives a dark display due to a decrease in CS potential as soon as the gate signal Vg rose up at a rising edge, the X group located close to the CS line driving circuit 40 gives a normal display.

With the gate signals Vg given a smaller pulse width W2 as shown in (b) of FIG. 7, such horizontal shadows as those shown in (c) of FIG. 5 appear during a display of the specific display pattern shown in (a) of FIG. 5.

The reason for this is as follows: the adjustment of the gate signals Vg to the smaller pulse width W2 causes the CS potentials to be subjected to a boost due to rises in the gate signals Vg after the CS potentials rose to a certain degree; therefore, while the Y group located away from the CS line driving circuit 40 gives a normal display due to the settling down of the CS potential at a higher level than that shown in (a) of FIG. 7, the X group located close to the CS line driving circuit 40 gives a bright display due to the settling down of the CS potential at a higher level than the normal potential.

With the gate signals Vg given an even smaller pulse width, such horizontal shadows as those shown in (d) of FIG. 5 appear during a display of the specific display pattern shown in (a) of FIG. 5.

The reason for this is as follows: the adjustment of the gate signals Wg to the even smaller pulse width causes the CS potentials to be subjected to a boost due to rises in the gate signals after the CS potentials rose to a considerable degree; therefore, both the CS potentials in the X and Y groups settle down at a higher level than the normal potential, so that the Y group located away from the CS line driving circuit 40 gives a bright display and the X group located close to the CS line driving circuit 40 gives a very bright display.

In the present invention, on the other hand, as shown in (c) of FIG. 7, the pulse width W4 of a gate signal that is supplied to the Y group is set smaller than the pulse width W3 of a gate signal Vg that is supplied to the X group.

Consequently, although the CS potential is large in bluntness in the Y group, making the pulse width W4 of the gate signal Vg small causes the CS potential to be subjected to a boost due to a rise in the gate signal Vg after the CS rose to a certain degree; therefore, the CS potential as soon as the gate signal Vg rose up at a rising edge is adjusted to substantially the same potential as in a case where the CS potential has no bluntness in its waveform, so that a normal display is carried out.

Meanwhile, since, in the X group, the CS potential is small in bluntness and a boost due to a rise in the gate signal Vg is small, the CS potential as soon as the gate signal Vg rose up at a rising edge is adjusted to substantially the same potential as in a case where the CS potential has no bluntness in its waveform, so that a normal display is carried out.

Although, in the present embodiment, only the specific display pattern is described, the effective value of liquid crystal application voltage in any pattern can be controlled to a desired level; therefore, display quality can be improved by controlling the luminance of a display element to a desired level.

The CS line driving circuit 40 in accordance with the present embodiment may be configured to be incorporated into the gate line driving circuit 30, or may alternatively be provided outside the gate line driving circuit 30 and connected to the gate line driving circuit 30.

Although the liquid crystal display device 1 in accordance with Embodiment 1 of the present invention employs an SSD gate drive system, it may employ an SSD source drive system.

Embodiment 2

Another embodiment of a liquid crystal display device (display device) of the present invention described below with reference to FIG. 8.

For convenience of explanation, those members which have the same functions as those shown in the drawings described above in Embodiment 1 are given the same reference signs, and as such, are not described below.

Figure 8:
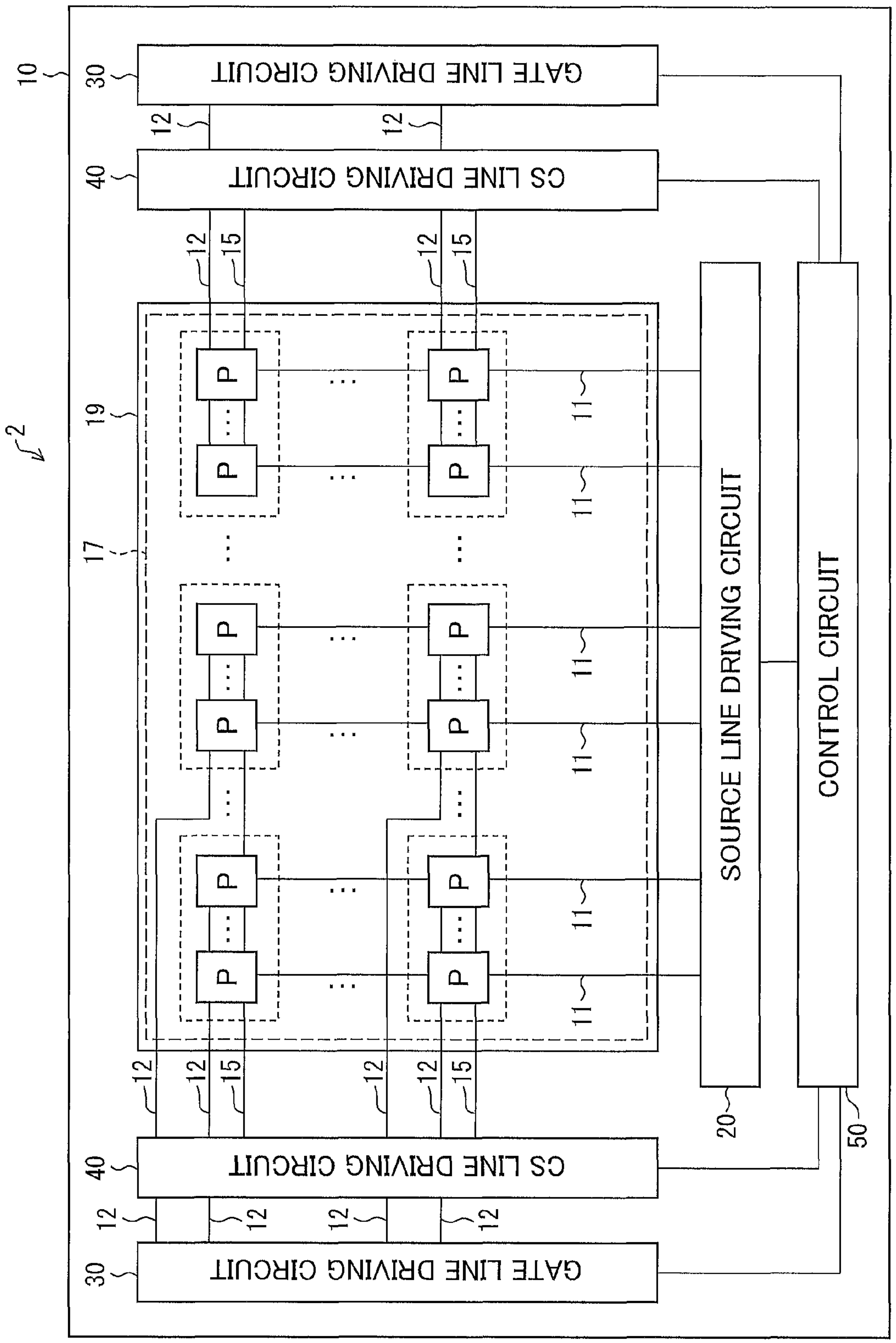
FIG. 8, showing an embodiment of the present invention, is a block diagram schematically showing a configuration of a liquid crystal display device according to Embodiment 2.

FIG. 8 is a block diagram showing an overall structure of a liquid crystal display device in accordance with the present embodiment.

As shown in FIG. 8, a liquid crystal display device 2 has CS line driving circuits (auxiliary capacitor signal line driving circuits) 40 and gate line driving circuits (scanning signal line driving circuits) 30 each disposed on either side of a liquid crystal panel 10, and gate signals that are supplied by the gate line driving circuit 30 and CS signals that are supplied by the CS line driving circuit 40 are supplied to a display region 17 through one edge of the display region 17 and another edge opposite to that one edge.

It should be noted that each of the rows is provided with a plurality of gate signal lines 12 for supplying scanning signals having different pulse widths from each other, that the pixels P of the same row are divided into a plurality of groups according to which of the gate signal lines 12 the pixels P are connected to, the plurality groups being arranged along the gate lines 12, and that the pulse widths of the scanning signals that are supplied to the respective groups are such that one of the groups which is further from the center of the display region 17 is supplied with that one of the gate signals which has a larger pulse width.

In the following, the principle of operation of the liquid crystal display device in accordance with the present embodiment is explained.

In a case where the CS line driving circuits 40 are disposed on both sides of the liquid crystal display panel 10, those pixels P located substantially in the center of the display region 17 are most affected by CS line resistance.

Consequently, the CS potential of those pixels P located substantially in the center of the display region 17 is largest in bluntness.

In the present embodiment, a group of pixels P located substantially in the center of the display region 17 is supplied with a gate signal having the smallest pulse width.

Thus, although the CS potential is largest in bluntness, the CS potential is subjected to a boost due to a rise in the gate signal after the CS potential rose to a considerable degree; therefore, the CS potential as soon as the gate signal rose up at a rising edge is adjusted to substantially the same potential as in a case where the CS potential has no bluntness in its waveform, so that a normal display is carried out. This makes it possible to prevent a horizontal shadow from appearing.

The present embodiment is advantageous when it is applied to a large-sized liquid crystal display panel.

Embodiment 3

Another embodiment of a liquid crystal display device (display device) of the present invention described below with reference to FIG. 9.

For convenience of explanation, those members which have the same functions as those shown in the drawings described above in Embodiment 1 are given the same reference signs, and as such, are not described below.

Figure 9:
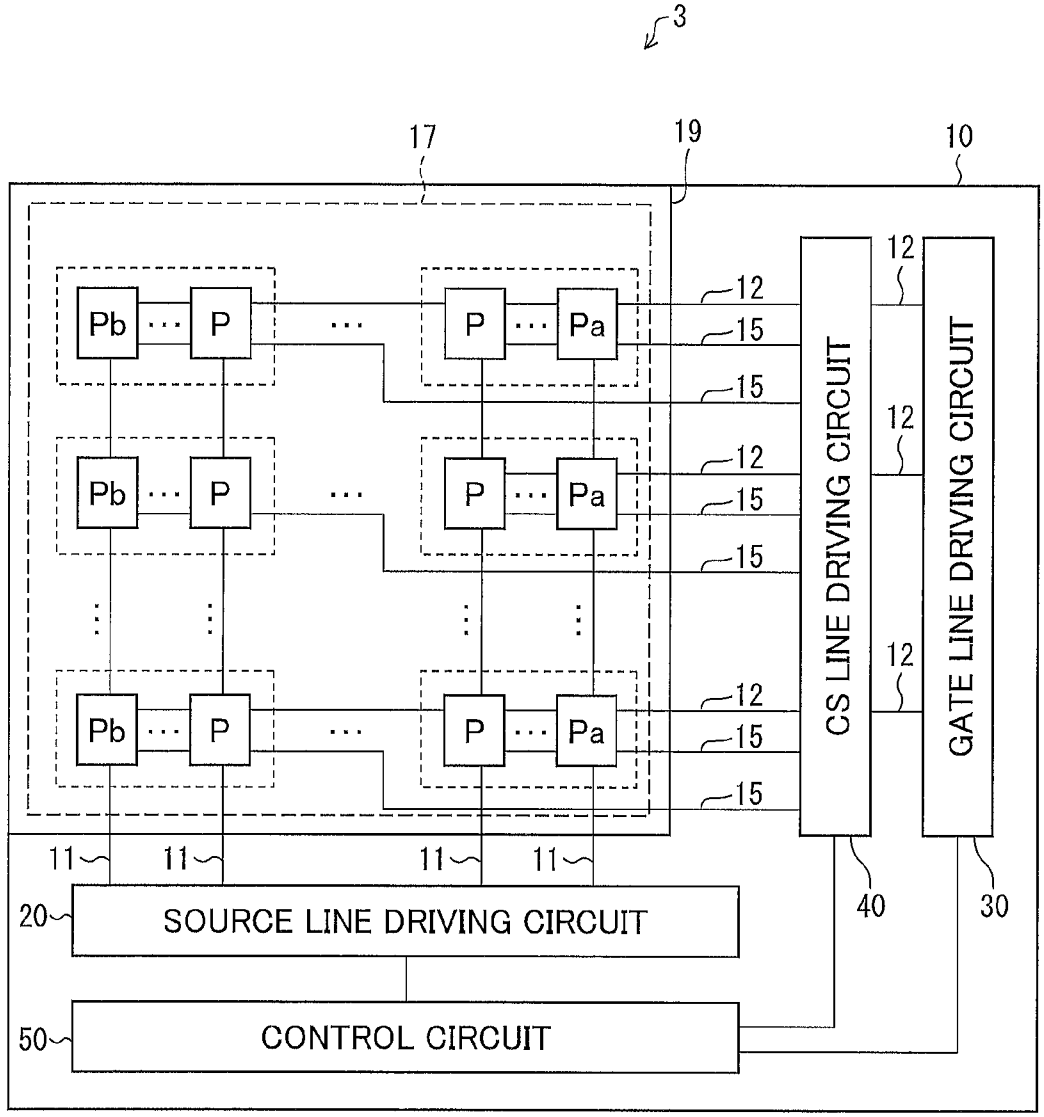
FIG. 9, showing an embodiment of the present invention, is a block diagram schematically showing a configuration of a liquid crystal display device according to Embodiment 3.
Figure 10:
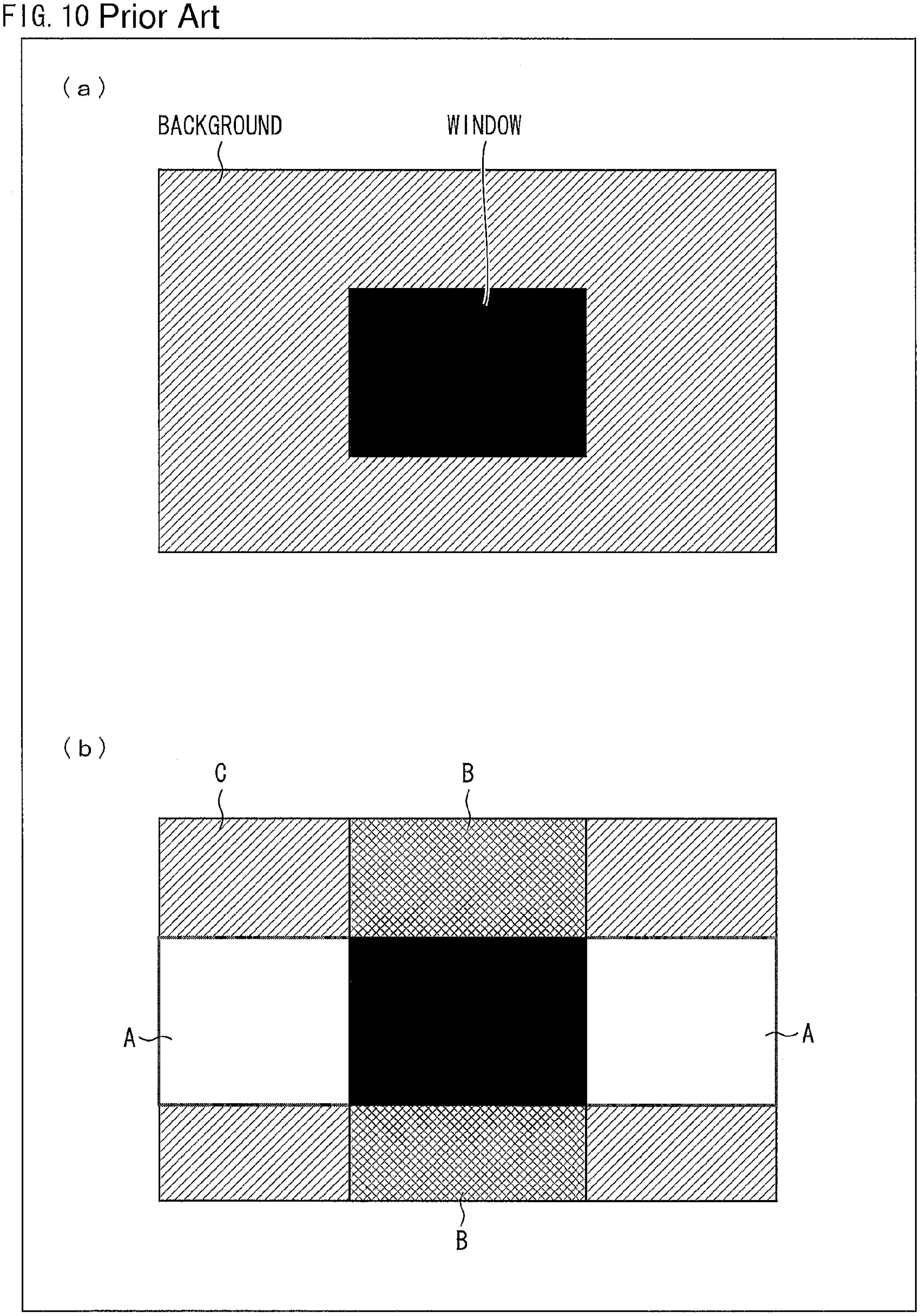
FIG. 10 Prior Art
FIG. 10, showing a conventional technology, is a set of diagrams (a) and (b) for explaining shadows appearing on the display screen of a liquid crystal display device.
Figure 11:
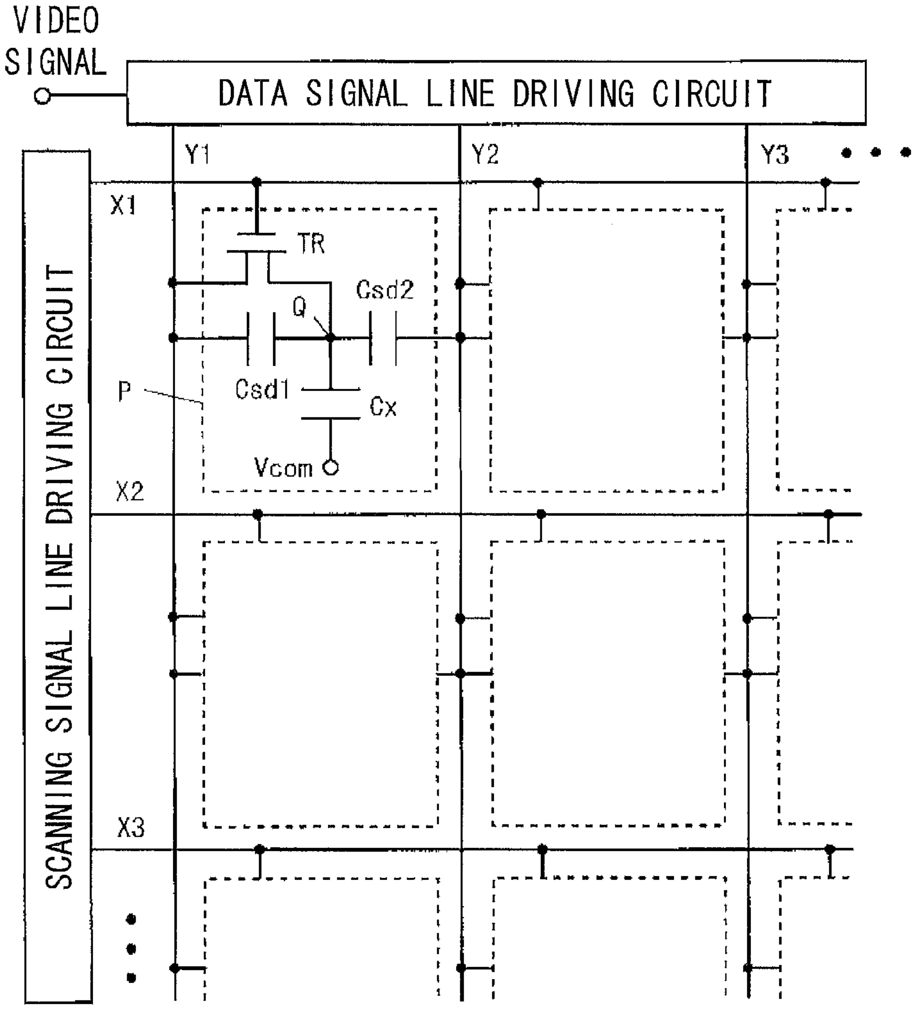
FIG. 11 Prior Art
FIG. 11, showing a conventional technology, is an equivalent circuit diagram of an active-matrix liquid crystal display device.
Figure 12:
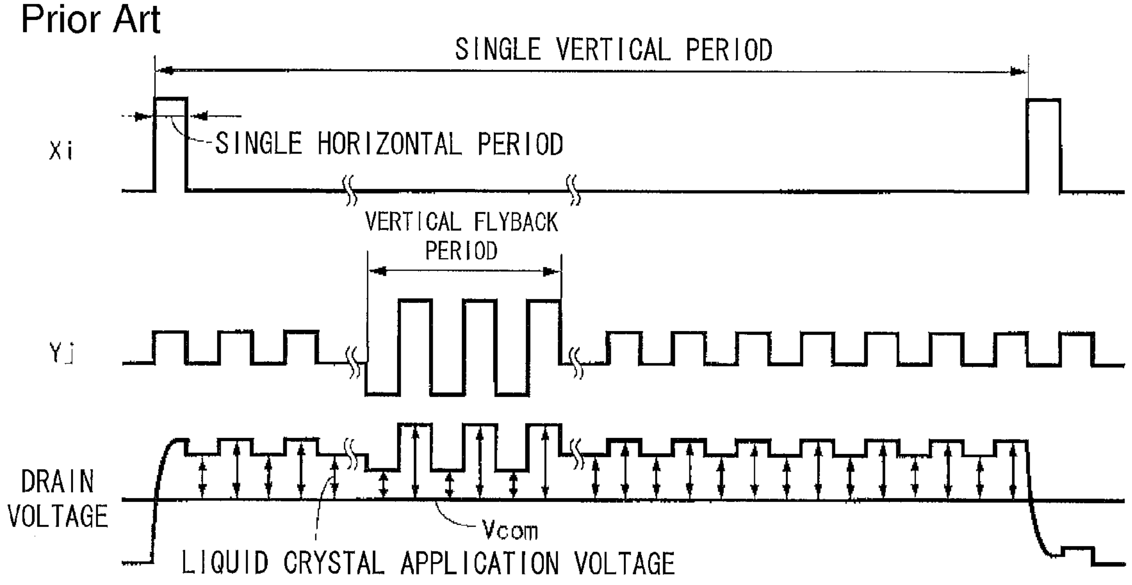
FIG. 12 Prior Art
FIG. 12, showing a conventional technology, is a signal waveform chart showing voltage in a display element of a liquid crystal display device (in the absence of a window).
Figure 13:
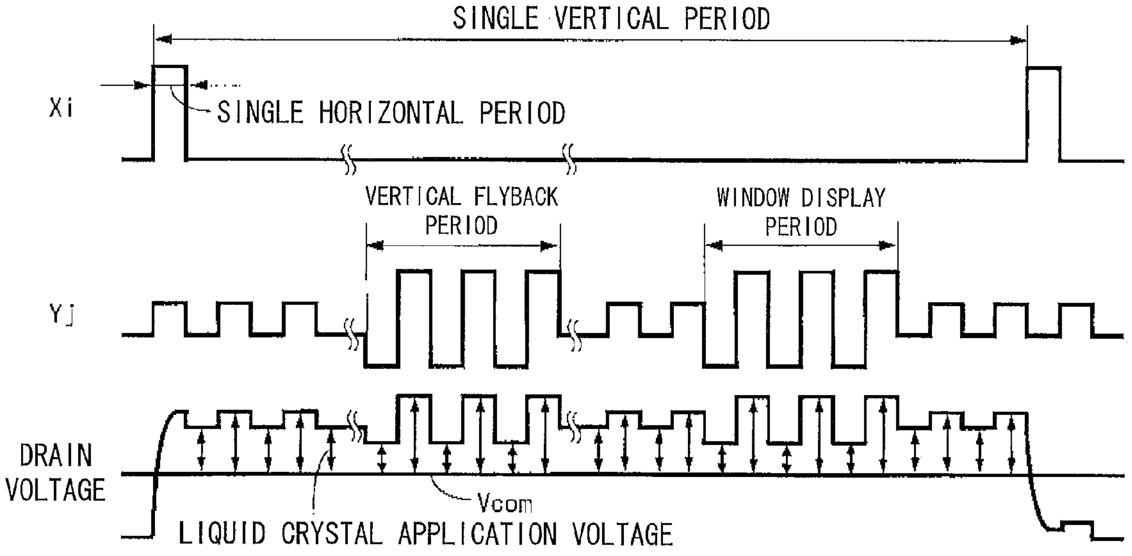
FIG. 13 Prior Art
FIG. 13, showing a conventional technology, is a signal waveform chart showing voltage in a display element of a liquid crystal display device (in the presence of a window).
Figure 14:
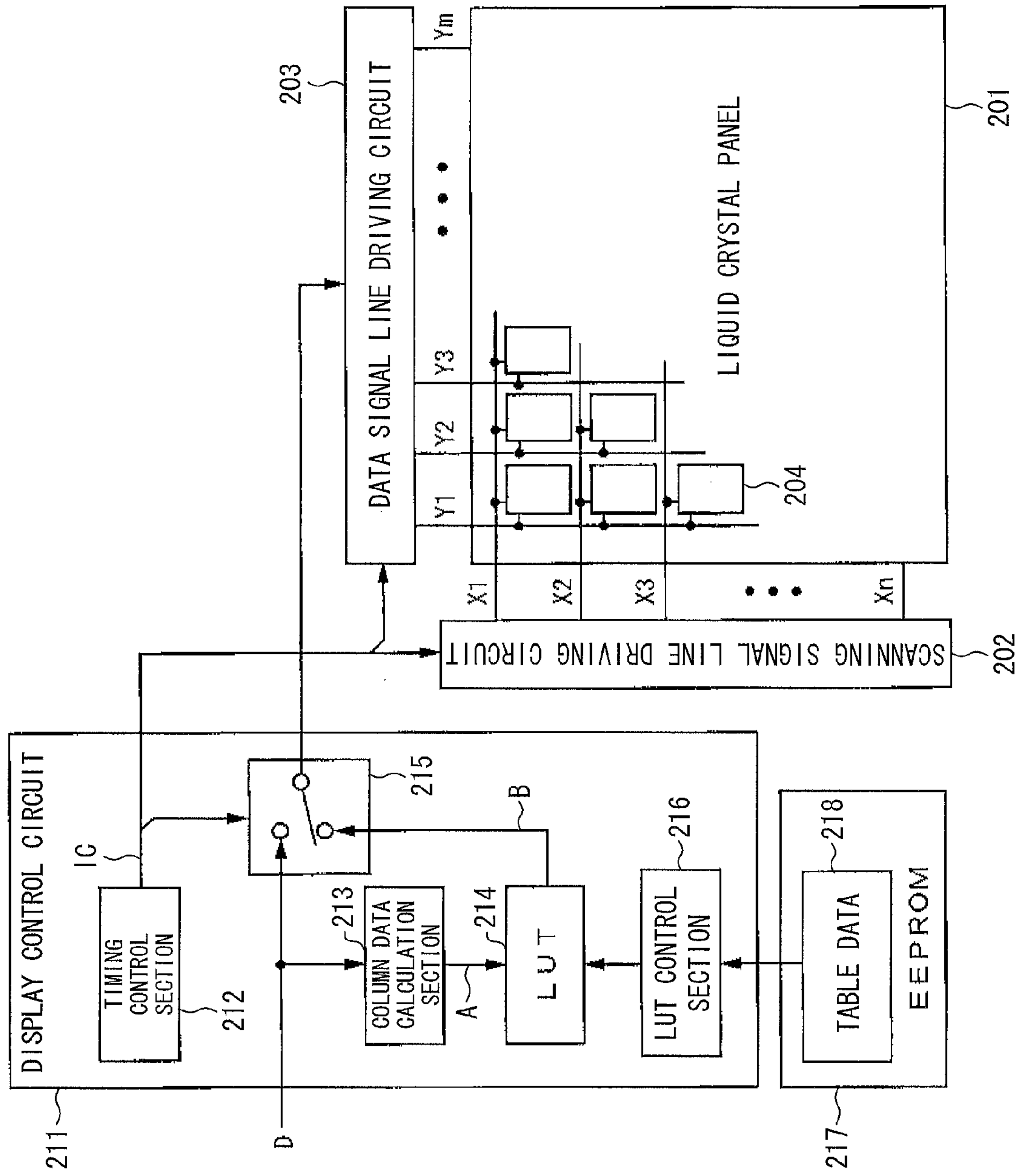
FIG. 14 Prior Art
FIG. 14, showing a conventional technology, is a block diagram showing a configuration of a liquid crystal display device described in Patent Literature 1.

FIG. 9 is a block diagram showing a configuration of a liquid crystal display device in accordance with the present embodiment.

As shown in FIG. 9, a liquid crystal display device 3 is configured such that each of the rows is provided with a plurality of CS signal lines 15 for supplying CS signals having different potentials from each other, that the pixels P of the same row are divided into a plurality of groups according to which of the CS signal lines 15 the pixels P are connected to, the plurality of groups being arranged along the gate lines 12, and that the potentials of the CS signals that are supplied to the respective groups are set according to the position of each of the groups with respect to the auxiliary capacitor signal line driving circuit 40 such that one of the groups which is further from a point close to one side near the auxiliary capacitor signal line driving circuit 40 with respect to the auxiliary capacitor signal line driving circuit 40 is supplied with that one of the CS signals which has a larger potential.

In the following, the principle of operation of the liquid crystal display device in accordance with the present embodiment is explained.

CS signals that are supplied to pixels Pb located away from the CS line driving circuit 40 are larger in bluntness than CS signals that are supplied pixels Pa located close to the CS line driving circuit 40.

In the present embodiment, the potentials of the CS signals that are supplied to the respective groups are such that one of the groups which is further from a point close to one side near the auxiliary capacitor signal line driving circuit 40 with respect to the auxiliary capacitor signal line driving circuit 40 is supplied with that one of the CS signals which has a larger potential. That is, the CS signals that are supplied to the pixels Pb are largest in potential, and the CS signals that are supplied to the pixels Pa are smallest in potential.

Thus, the voltages that are actually applied to the liquid crystals in each separate pixel P in the display region 17 are adjusted to be substantially uniform. This makes it possible to prevent a horizontal shadow.

Embodiment 4

Another embodiment of a liquid crystal display device (display device) of the present invention described below.

For convenience of explanation, those members which have the same functions as those shown in the drawings described above in Embodiment 3 are given the same reference signs, and as such, are not described below.

A liquid crystal display device of the present embodiment has CS line driving circuits (auxiliary capacitor signal line driving circuits) 40 and gate line driving circuits (scanning signal line driving circuits) 30 each disposed on either side of a liquid crystal panel 10, and gate signals that are supplied by the gate line driving circuit 30 and CS signals that are supplied by the CS line driving circuit 40 are supplied to a display region 17 through one edge of the display region 17 and another edge opposite to that one edge.

It should be noted that each of the rows is provided with a plurality of CS signal lines 15 for supplying CS signals having different potentials from each other, that the pixels P of the same row are divided into a plurality of groups according to which of the CS signal lines 15 the pixels P are connected to, the plurality groups being arranged along the gate lines 12, and that the potentials of the CS signals that are supplied to the groups are such that one of the groups which is further from the center of the display region 17 is supplied with that one of the CS signals which has a smaller potential.

In the following, the principle of operation of the liquid crystal display device in accordance with the present embodiment is explained.

In a case where the CS line driving circuits 40 are disposed on both sides of the liquid crystal display panel 10, those pixels P located substantially in the center of the display region 17 are most affected by CS line resistance.

Consequently, the CS potential of those pixels P located substantially in the center of the display region 17 is largest in bluntness.

In the present embodiment, a group of pixels P located substantially in the center of the display region 17 is supplied with a CS signal having the largest potential.

This causes the CS potential to be adjusted to substantially the same potential as in a case where the CS potential has no bluntness in its waveform, so that a normal display is carried out. This makes it possible to prevent a horizontal shadow from appearing.

The present invention is not limited to the description of the embodiments above, but may be altered by a skilled person within the scope of the claims. An embodiment based on a proper combination of technical means disclosed in different embodiments is encompassed in the technical scope of the present invention.

The display device according to the present invention is preferably configured such that the scanning signal lines are driven in a time-sharing manner for each set composed of a plurality of these scanning signal lines.

The foregoing configuration brings about an effect of making it possible to prevent the number of outputs from the scanning signal line driving circuit from increasing due to an increase in the number of scanning signal lines in the present invention.

INDUSTRIAL APPLICABILITY

The present invention can be suitably applied, in particular, to an active-matrix display device.

REFERENCE SIGNS LIST

1 Liquid crystal display device (display device)
2 Liquid crystal display device (display device)
3 Liquid crystal display device (display device)
10 Liquid crystal display panel
11 Source line
12 Gate line (scanning signal line)
13 TFT
14 Pixel electrode
15 CS line (auxiliary capacitor signal line)
17 Display region
19 Counter electrode
20 Source line driving circuit
30 Gate line driving circuit (scanning signal line driving circuit)
40 CS line driving circuit (auxiliary capacitor signal line driving circuit)
50 Control circuit
P Pixel
W Pulse width
Vg Gate signal (scanning signal)

The invention claimed is:

1. A display device of an active-matrix type having a plurality of pixels arranged in rows and columns, comprising:

scanning signal lines;

a scanning signal line driving circuit that drives the scanning signal lines;

auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through one and the same edge of or opposite and different edges of the display region, each of the rows being provided with a plurality of said scanning signal lines for supplying those ones of the scanning signals which have different pulse widths from each other, said pixels of the same row being divided into a plurality of groups according to which of the scanning signal lines the pixels are connected to, the plurality of groups being arranged along the scanning signal lines, the pulse widths of said scanning signals that are supplied to the respective groups being set according to a position of each of the groups with respect to the auxiliary capacitor signal line driving circuit such that one of the groups which is further from a point close to one edge near the auxiliary capacitor signal line driving circuit with respect to the auxiliary capacitor signal line driving circuit is supplied with that one of the scanning signals which has a smaller pulse width.

2. A display device of an active-matrix type having a plurality of pixels arranged in rows and columns, comprising:

scanning signal lines;

a scanning signal line driving circuit that drives the scanning signal lines;

auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through both one edge of the display region and another edge opposite to that one edge, each of the rows being provided with a plurality of said scanning signal lines for supplying those ones of the scanning signals which have different pulse widths from each other, said pixels of the same row being divided into a plurality of groups according to which of the scanning signal lines the pixels are connected to, the plurality of groups being arranged along the scanning signal lines, the pulse widths of said scanning signals that are supplied to the respective groups are such that one of the groups which is further from a center of the display region is supplied with that one of the scanning signals which has a larger pulse width.

3. The display device as set forth in claim 1, wherein the scanning signal lines are driven in a time-sharing manner for each set composed of a plurality of said scanning signal lines.

4. A display device of an active-matrix type having a plurality of pixels arranged in rows and columns, comprising:

scanning signal lines;

a scanning signal line driving circuit that drives the scanning signal lines;

auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through one and the same edge of or opposite and different edges of the display region, each of the rows being provided with a plurality of said auxiliary capacitor signal lines for supplying those ones of the auxiliary capacitor signals which have different potentials from each other, said pixels of the same row being divided into a plurality of groups according to which of the auxiliary capacitor signal lines the pixels are connected to, the plurality of groups being arranged along the scanning signal lines, the potentials of said auxiliary capacitor signals that are supplied to the respective groups being set according to a position of each of the groups with respect to the auxiliary capacitor signal line driving circuit such that one of the groups which is further from a point close to one edge near the auxiliary capacitor signal line driving circuit with respect to the auxiliary capacitor signal line driving circuit is supplied with that one of the auxiliary capacitor signals which has a larger potential.

5. A display device of an active-matrix type having a plurality of pixels arranged in rows and columns, comprising:

scanning signal lines;

a scanning signal line driving circuit that drives the scanning signal lines;

auxiliary capacitor signal lines formed in each separate one of the rows; and an auxiliary capacitor signal line driving circuit that drives the auxiliary capacitor signal lines, the scanning signal line driving circuit supplying scanning signals, the auxiliary capacitor signal line driving circuit supplying auxiliary capacitor signals, the scanning signals and the auxiliary capacitor signals being supplied to a display region through both one edge of the display region and another edge opposite to that one edge, each of the rows being provided with a plurality of said auxiliary capacitor signal lines for supplying those ones of the auxiliary capacitor signals which have different potentials from each other, said pixels of the same row being divided into a plurality of groups according to which of the auxiliary capacitor signal lines the pixels are connected to, the plurality of groups being arranged along the scanning signal lines, the potentials of said auxiliary capacitor signals that are supplied to the respective groups are such that one of the groups which is further from a center of the display region is supplied with that one of the auxiliary capacitor signals which has a smaller potential.

* * * * *